US012603558B2

(12) United States Patent
Lee et al.

(10) Patent No.: US 12,603,558 B2
(45) Date of Patent: Apr. 14, 2026

(54) PRINTED CIRCUIT BOARD STATOR WINDING ENHANCEMENTS FOR AXIAL FIELD ROTARY ENERGY DEVICE

(71) Applicant: INFINITUM ELECTRIC, INC., Round Rock, TX (US)

(72) Inventors: Richard Lee, Austin, TX (US); Edward C. Carignan, Round Rock, TX (US); Paulo Guedes-Pinto, Round Rock, TX (US)

(73) Assignee: INFINITUM ELECTRIC INC., Austin, TX (US)

( * ) Notice: Subject to any disclaimer, the term of this patent is extended or adjusted under 35 U.S.C. 154(b) by 357 days.

(21) Appl. No.: 18/230,572

(22) Filed: Aug. 4, 2023

(65) Prior Publication Data

US 2025/0047183 A1    Feb. 6, 2025

(51) Int. Cl.
  *H02K 21/24*      (2006.01)
  *H02K 3/28*       (2006.01)
  *H02K 11/25*      (2016.01)
(52) U.S. Cl.
  CPC ............... *H02K 21/24* (2013.01); *H02K 3/28* (2013.01); *H02K 11/25* (2016.01); *H02K 2203/03* (2013.01)
(58) Field of Classification Search
  CPC ......... H02K 1/2793–2798; H02K 3/26; H02K 11/25
  USPC ........................................ 310/154.37, 156.32
  See application file for complete search history.

(56) References Cited

U.S. PATENT DOCUMENTS

| | | | |
|---|---|---|---|
| 7,109,625 B1 | 9/2006 | Jore et al. | |
| 8,736,133 B1 | 5/2014 | Smith et al. | |
| 10,135,310 B2 | 11/2018 | Schuler et al. | |
| 10,141,803 B2 | 11/2018 | Schuler et al. | |
| 10,141,804 B2 | 11/2018 | Schuler et al. | |
| 10,170,953 B2 | 1/2019 | Shaw | |
| 10,186,922 B2 | 1/2019 | Schuler et al. | |
| 10,340,760 B2 | 7/2019 | Schuler et al. | |
| 2006/0202584 A1* | 9/2006 | Jore ..................... | H02K 11/215 310/179 |

(Continued)

FOREIGN PATENT DOCUMENTS

| | | |
|---|---|---|
| KR | 102371396 B1 | 3/2022 |
| WO | 2021096804 A1 | 5/2021 |

OTHER PUBLICATIONS

European Patent Office, Search Report and Written Opinion for International Application No. PCT/US2024/030526, Date of Mailing Nov. 20, 2024, 20 pages.

(Continued)

*Primary Examiner* — Oluseye Iwarere
*Assistant Examiner* — Minki Chang
(74) *Attorney, Agent, or Firm* — Dickinson Wright PLLC

(57) ABSTRACT

An axial field rotary energy device can include a rotor having an axis of rotation and a printed circuit board (PCB) stator having PCB panels. Each PCB panel has conductive layers, each conductive layer has coils, and each coil has radial conductors and end turn conductors. The PCB stator also has conductive pads coupled to a temperature sensor. Each conductive pad is connected to a terminal through a respective conductive trace. The conductive pads are axially aligned or located directly adjacent to respective end turn conductors in a conductive layer that is separated from the end turn conductors by an insulation layer.

18 Claims, 16 Drawing Sheets

(56) References Cited

U.S. PATENT DOCUMENTS

| | | | |
|---|---|---|---|
| 2011/0273048 A1 | 11/2011 | Jore et al. | |
| 2013/0307367 A1 | 11/2013 | Yoshida et al. | |
| 2015/0155070 A1 | 6/2015 | Cao et al. | |
| 2015/0214801 A1 | 7/2015 | Libault | |
| 2018/0048204 A1 | 2/2018 | Sullivan et al. | |
| 2018/0219445 A1 | 8/2018 | Jore et al. | |
| 2019/0238018 A1* | 8/2019 | Schuler | H02K 1/182 |
| 2021/0143696 A1 | 5/2021 | Guedes-Pinto et al. | |
| 2021/0203213 A1 | 7/2021 | Jore et al. | |
| 2022/0094225 A1 | 3/2022 | Schuler et al. | |

OTHER PUBLICATIONS

European Patent Office, Extended European Search Report for European Application No. 24195310.8, Date of Mailing Dec. 9, 2024, 13 pages.

\* cited by examiner

PRINTED CIRCUIT BOARD STATOR WINDING ENHANCEMENTS FOR AXIAL FIELD ROTARY ENERGY DEVICE

CROSS-REFERENCE TO RELATED APPLICATIONS

None.

BACKGROUND

Field of the Disclosure

The present disclosure relates in general to an axial field rotary energy device and, in particular, to a system, method and apparatus for motors and generators having one or more printed circuit board (PCB) stators.

Description of the Prior Art

Some axial field electric machines, such as motors or generators, use printed circuit board (PCB) stator structures. Examples of such apparatuses are described in U.S. Pat. Nos. 10,141,803, 10,135,310, 10,340,760, 10,141,804 and 10,186,922, each of which is incorporated herein by reference in its entirety. These PCB stator structures are produced through a combination of etching, laminating, drilling and plating operations that can be repeated until a complete PCB stator is obtained. While the manufacturing process of these PCB stators is well established, it is desirable to simplify the manufacturing process to reduce costs. Some PCB stator designs require the PCB stator to be split into PCB panels that are processed individually, namely going through etching, laminating, drilling and plating operations, then undergoing additional laminating, drilling, and plating operations. By selecting and applying design features to the PCB stator, some of the previously mentioned repetitive operations can be eliminated resulting in a faster and more economical manufacturing process.

SUMMARY

Embodiments of an axial field rotary energy device are disclosed. For example, the device can include a rotor having an axis of rotation and a printed circuit board (PCB) stator having PCB panels. Each PCB panel has conductive layers, each conductive layer has coils, and each coil has radial conductors and end turn conductors. The PCB stator also has conductive pads coupled to a temperature sensor. Each conductive pad is connected to a terminal through a respective conductive trace. The conductive pads are axially aligned or located directly adjacent to respective end turn conductors in a conductive layer that is separated from the end turn conductors by an insulation layer.

BRIEF DESCRIPTION OF THE DRAWINGS

So that the manner in which the features and advantages of the embodiments are attained and can be understood in more detail, a more particular description can be had by reference to the embodiments thereof that are illustrated in the appended drawings. However, the drawings illustrate only some embodiments and therefore are not to be considered limiting in scope as there can be other equally effective embodiments.

DETAILED DESCRIPTION

Figure 1:
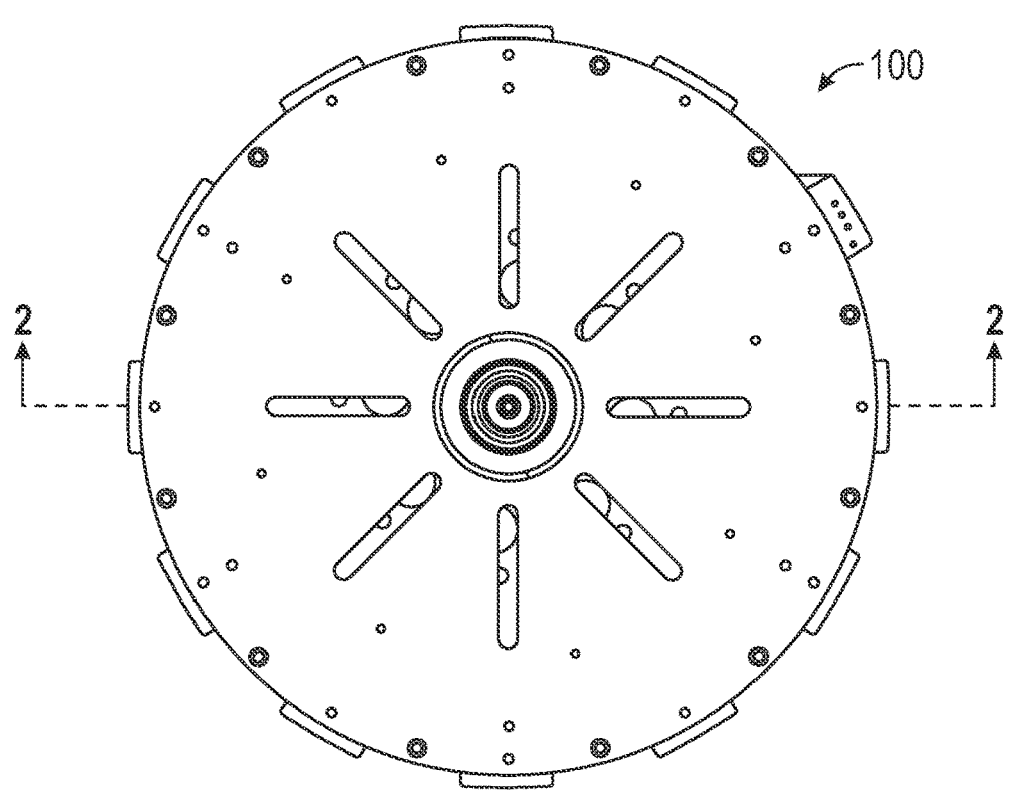
FIG. 1 is a front view of an embodiment of an axial field rotary energy device.
Figure 2:
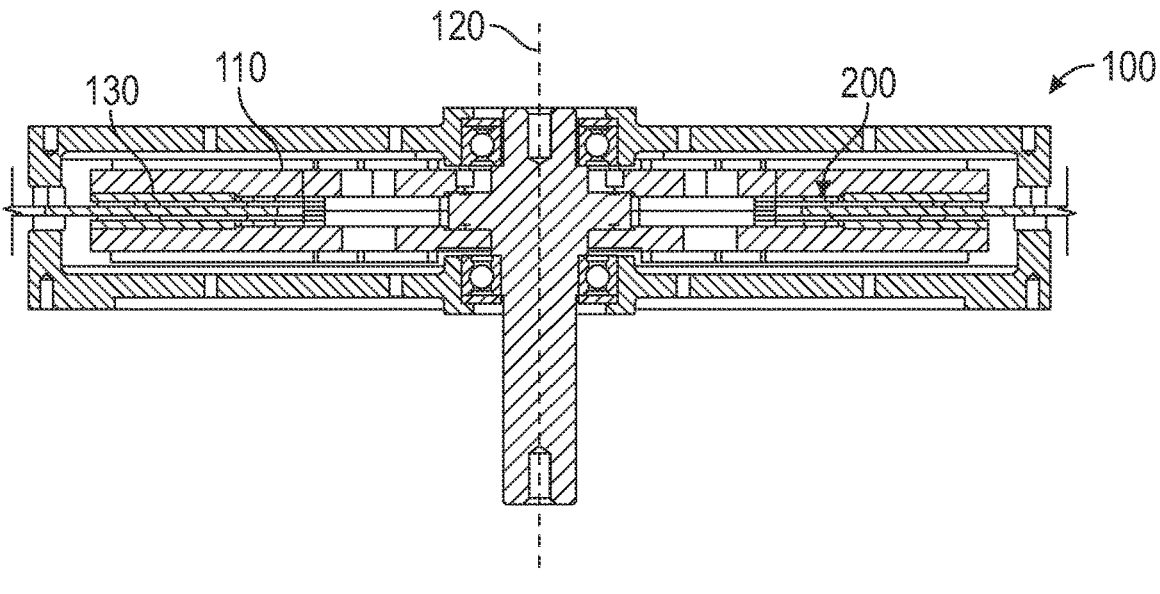
FIG. 2 is a sectional side view of the device of FIG. 1 taken along section line 2-2 of FIG. 1.

FIGS. 1-9 disclose various embodiments of axial field rotary energy devices. Some axial field electric machines can include one, two or more PCB stators, such as one for each electrical phase of the machine. FIGS. 1 and 2 depict a typical multiphase axial field rotary energy device, or multiphase device 100. The multiphase device 100 can include at least one rotor 110 (two shown, in FIG. 2) with an axis of rotation 120. Each rotor 110 can comprise at least one magnet 130. The multiphase device 100 can also include at least one PCB stator 200 that is coaxial with the rotor 110.

Figure 3A:
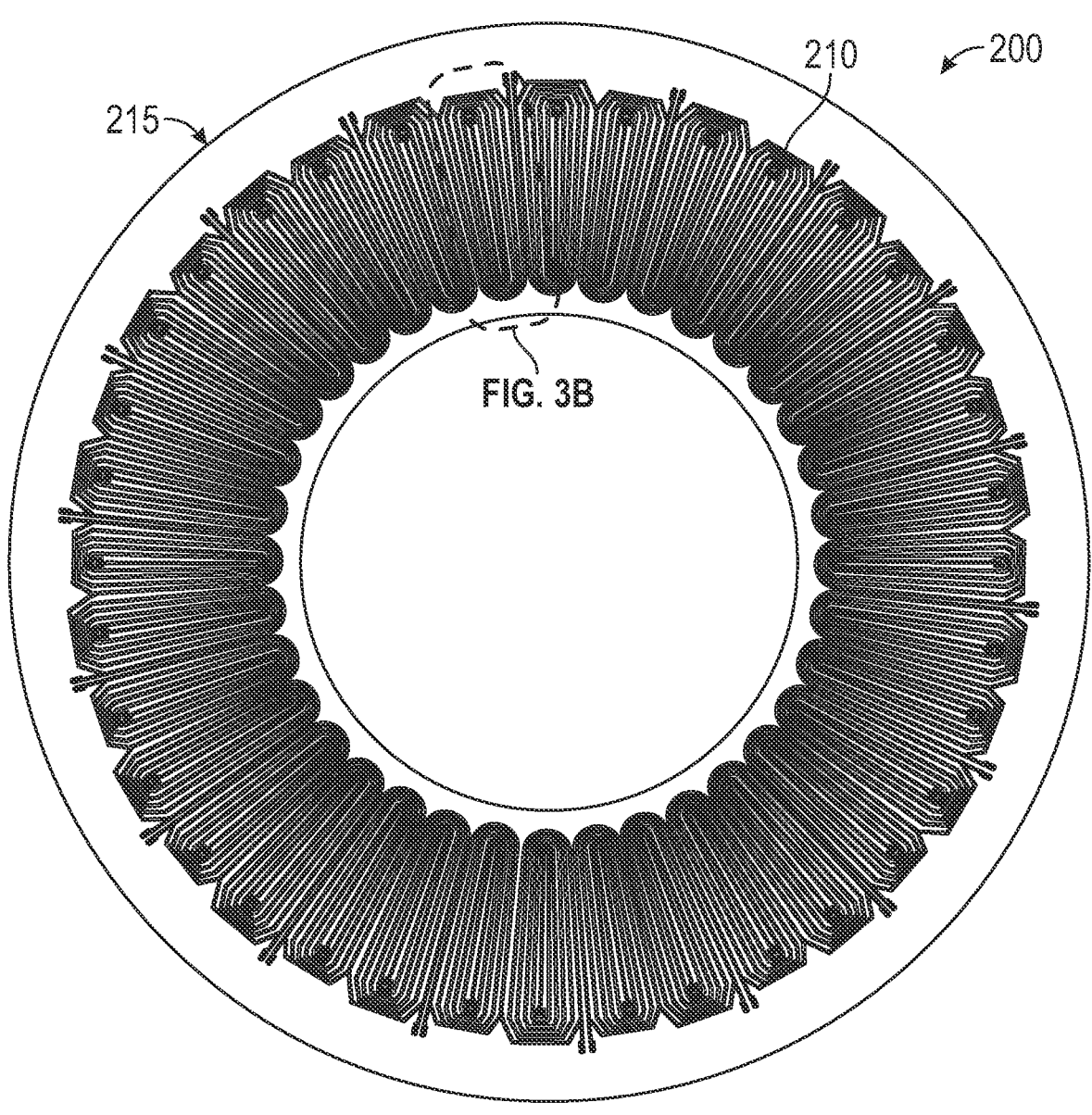
FIG. 3A is a front view of an embodiment of a PCB stator.

Each PCB stator 200, as shown in FIG. 3A, can include a plurality of coils 210 etched, for example, in the copper foil of a laminated structure of the PCB. The coils 210 can be supported by a dielectric structure 215 made of, for example, epoxy-glass laminate, polyimide-glass laminate, or PTFE-ceramic laminate. The coils 210 can include multiple turns depending on the design of the PCB stator 200. The coils 210 in the PCB stator 200 can be interconnected by means of traces (not shown in FIG. 3A) etched in the copper foil of a PCB laminate structure to form north and south poles. While FIG. 3A shows an example of a 36-pole stator, many other pole configurations are possible.

Figures 3B, 3C:
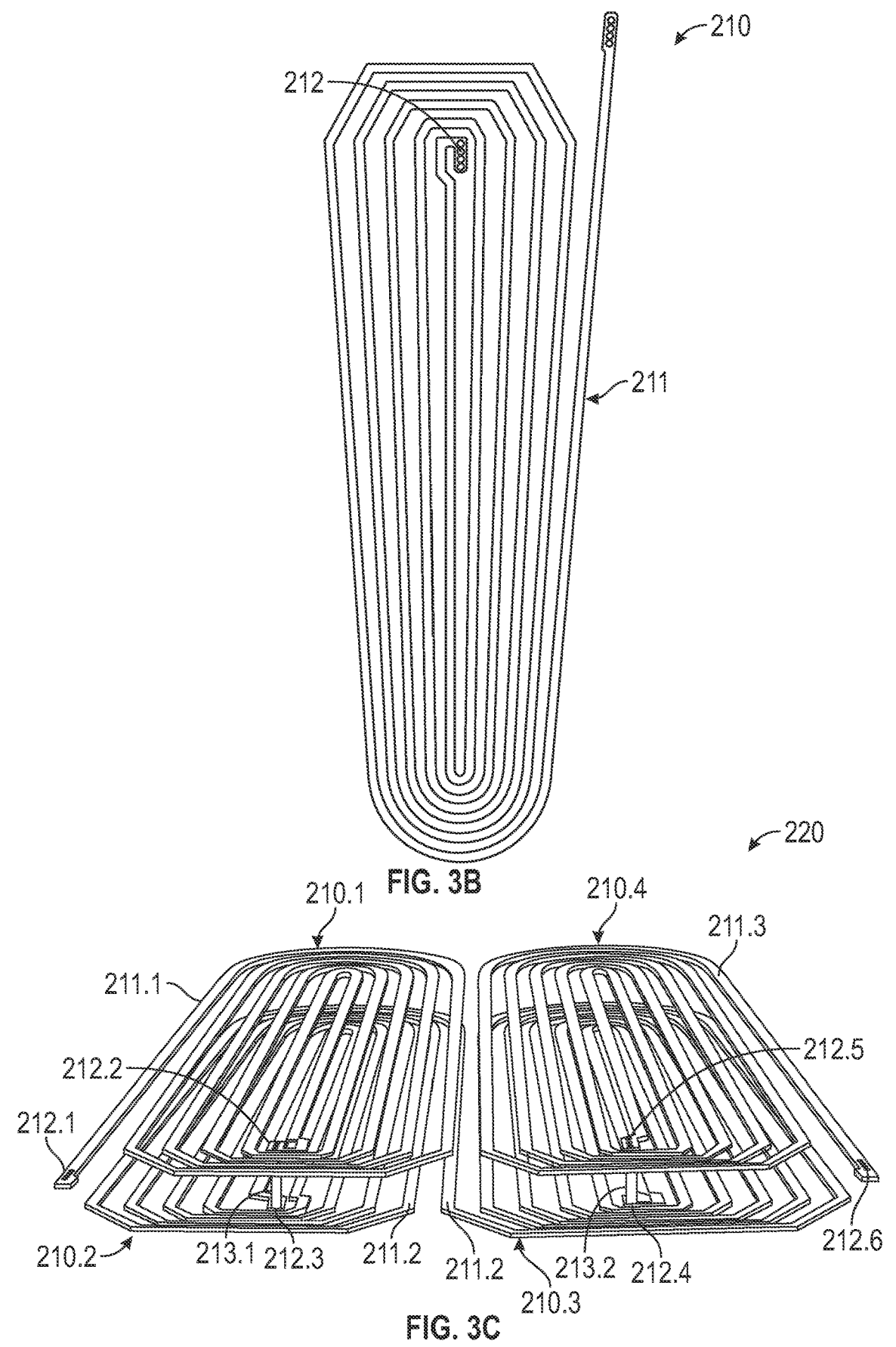
FIG. 3B is an enlarged front view of an embodiment of a coil in the PCB stator of FIG. 3A.
FIG. 3C is an exploded, isometric side view of an embodiment of a set of coils, namely a coil subassembly, in the PCB stator of FIG. 3A where the dielectric layers are not shown and the via length is increased for ease of understanding.

FIG. 3B depicts a coil 210 in more detail. Coil 210 can be formed as a continuous conductive trace 211 that can be etched out of a layer of copper foil laminated on a dielectric laminate such as FR4 glass-epoxy laminate, for example. The continuous conductive trace 211 of coil 210 can have perforations 212 at both of its terminal ends. The perforations 212 can connect coil 210 to other coils in the PCB stator 200. Although coil 210 is shown as having 5-turns, other PCB stators may have coils with different numbers of turns.

FIG. 3C shows an embodiment where the coils are interconnected to form a continuous path, which is hereinafter referred to as a coil subassembly 220. In FIG. 3C, the dielectric material of the PCB laminate structure is not shown for better visualization of the coil structure. In the coil subassembly 220, a first coil 210.1 located on one layer of the PCB structure can have a first terminal 212.1 that can be connected to other coils, or to an external voltage source such as a variable frequency drive (VFD). A trace 211.1 can be etched on the copper of a PCB laminate structure to form turns that are terminated at a second terminal 212.2. The second terminal 212.2 is coupled to a third terminal 212.3, that is part of a second coil 210.2 located in another layer of the PCB structure, by means of a via, such as a plated via 213.1. The second coil 210.2 can have a trace 211.2 that can be etched on the copper of the PCB laminate structure to form turns. The trace 211.2 can seamlessly connect and form turns of a third coil 210.3 that terminates at a fourth terminal 212.4. The fourth terminal 212.4 can be coupled to a fifth terminal 212.5 that is part of a fourth coil 210.4 located in the same PCB layer as the first coil 210.1. The fourth coil 210.4 can have a trace 211.3 that can be etched on the copper of the PCB laminate structure to form turns and terminate at a sixth terminal 212.6. The sixth terminal 212.6 can be connected to still other coils, or to an external voltage source such as a VFD. Although coil subassembly 220 is shown as having coils with 5 turns, it should be understood that other coil subassemblies can have different numbers of turns.

Figure 4A:
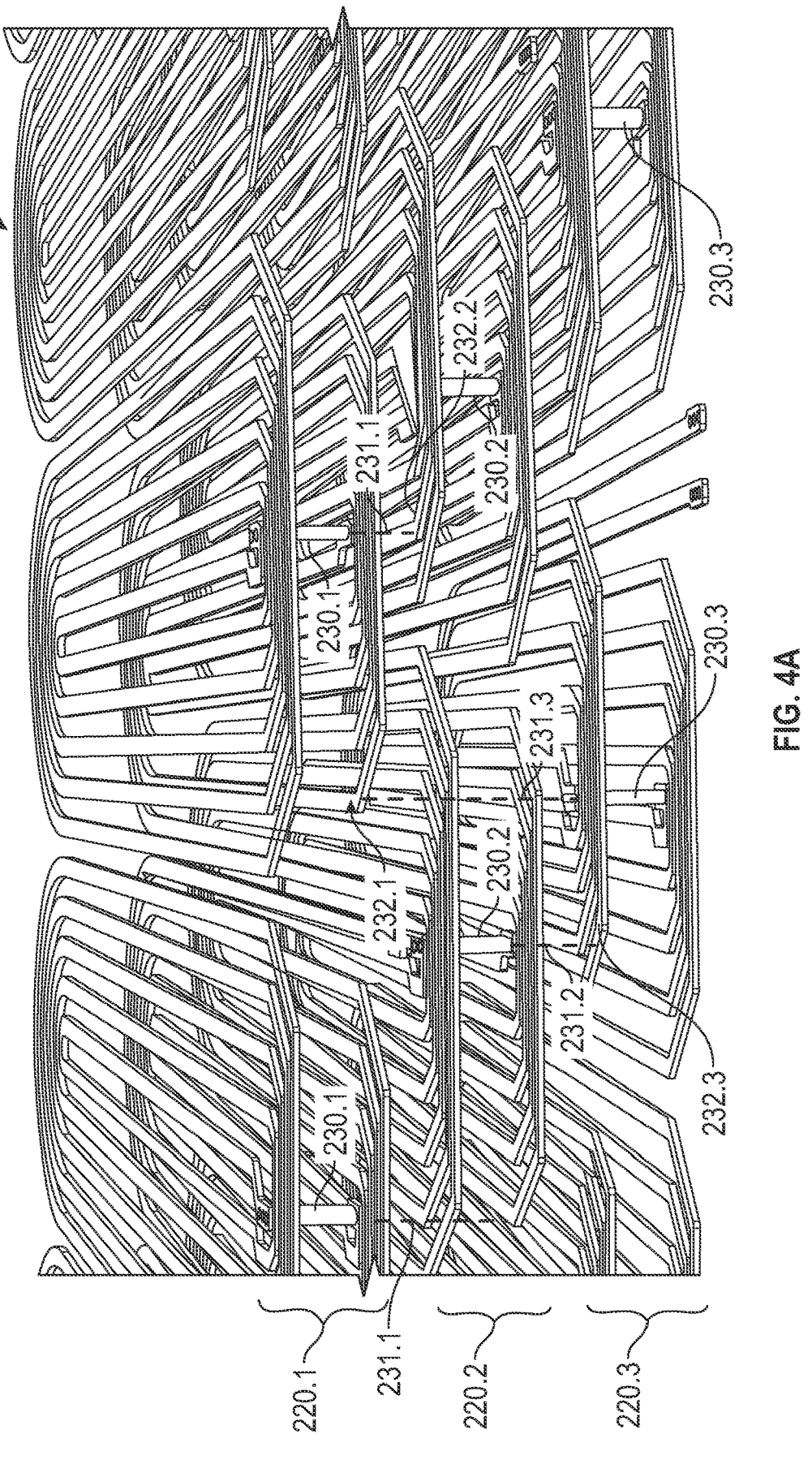
FIG. 4A is an exploded, isometric view of an embodiment of a PCB stator where the dielectric layers are not shown, and the via length is increased for better visualization.
Figure 4B:
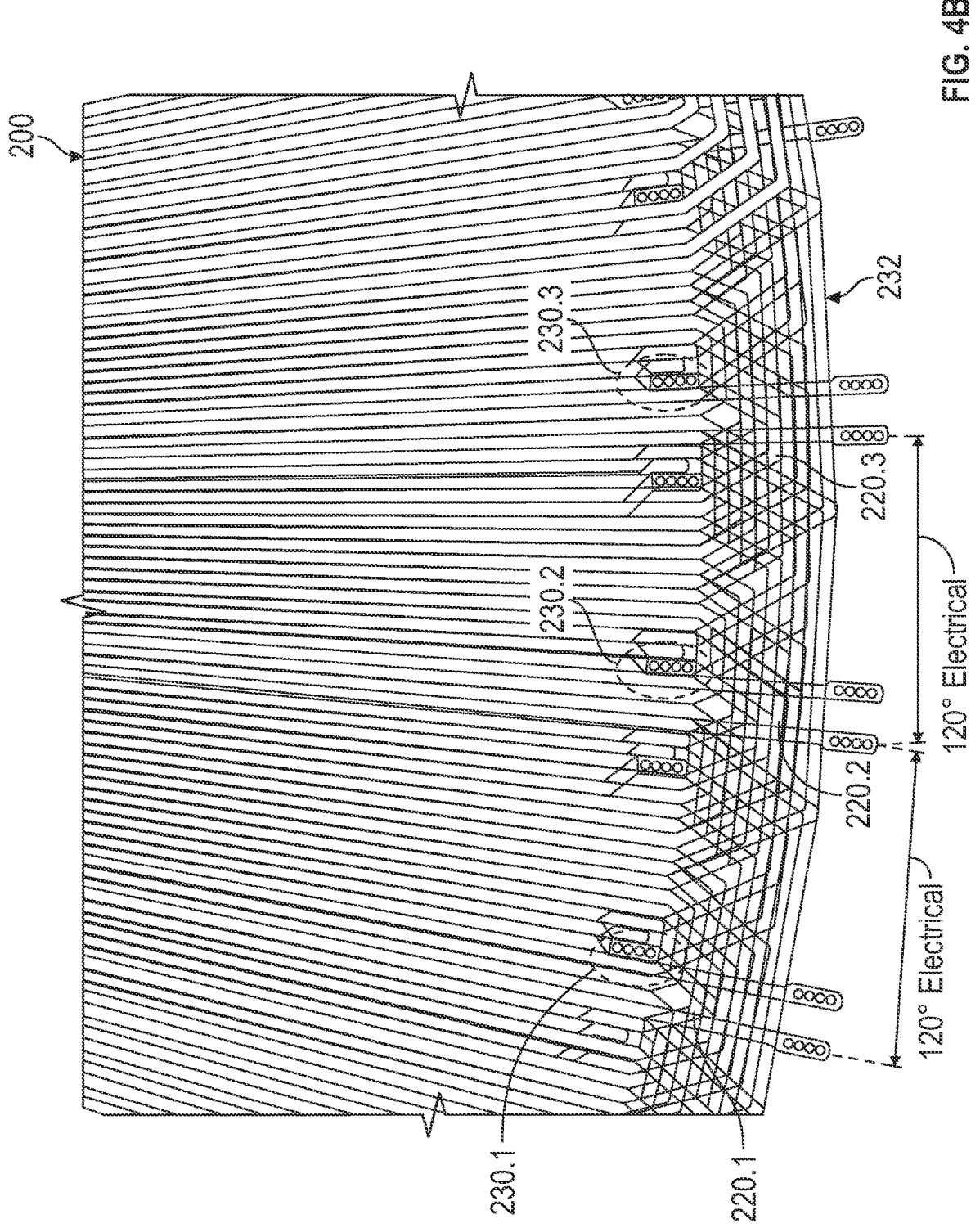
FIG. 4B is a partial top view of a portion of an embodiment of the PCB stator of FIG. 4A.

FIGS. 4A and 4B show partial views of an embodiment of the PCB stator 200 where the dielectric material is not shown and the length of the vias is increased for better visualization. FIG. 4A shows an example of a 3-phase PCB stator with two layers per phase. Each pair of layers can form a PCB panel that comprises a plurality of coil subassemblies 220.1, 220.2 and 220.3, respectively. Each PCB panel can be assigned to one electrical phase. Each coil subassembly 220.1, 220.2, 220.3 can comprise a set of plated vias 230.1, 230.2 and 230.3, respectively, that connect the coils in each coil subassembly 220.1, 220.2, 220.3 to form a continuous path.

FIG. 4B shows that the stator panels, and therefore the coil subassemblies, can be rotatably shifted relative to each other by 120 electrical degrees, which is 360 electrical degrees divided by the number of phases. Hereinafter, it should be noted that 360 electrical degrees cover the angular span of two consecutive poles, or a pair of poles. The PCB stator example shown in FIGS. 3A-4B has 36 poles. Thus, each pole in this one example has a physical span of 10 mechanical degrees and a pair of poles has a physical span of 20 mechanical degrees. In this example, 360 electrical degrees are equivalent to 20 mechanical degrees and 120 electrical degrees are equivalent to 6.67 mechanical degrees. The formula for this conversion is: mechanical degrees=electrical degrees/number of pairs of poles.

Although FIGS. 4A and 4B show a 3-phase stator structure, it should be understood that PCB stators can have 2, 4, 5, 6, or another number of phases. It should also be noted that although each phase in PCB stator 200 has one pair of layers per phase, other PCB stators can have 2, 3, 4 or more pairs of layers per phase.

In the example shown in FIGS. 4A and 4B, it can be seen that if one of the vias 230.1 in coil subassembly 220.1 was extended along the line 231.1, which is substantially co-linear with said one of the vias 230.1, it would intersect the trace 232.2 in coil subassembly 230.2. Similarly, if one of the vias 230.2 in coil subassembly 220.2 was extended along line 231.2, which is substantially co-linear with said one of the vias 230.2, it would intersect the trace 232.3 in coil subassembly 230.3. Finally, if one of the vias 230.3 in coil subassembly 220.3 was extended along line 231.3, which is substantially co-linear with said one of the vias 230.3, it would intersect trace 232.1 in coil subassembly 230.1.

FIG. 4B shows a top view of the PCB stator 200 where the locations of vias 230.1, 230.2 and 230.3 are indicated. Similarly to FIG. 4A, it can be seen that vias 230.1, which are in coil subassembly 220.1, are substantially vertically aligned with traces 232 from other layers. Similarly, vias 230.2, which are in coil subassembly 220.2, are substantially vertically aligned with traces 232 from other layers. Finally, vias 230.3 of coil subassembly 220.3 are substantially vertically aligned with traces 232 from other layers. As this vertical alignment can cause vias to intersect traces in other PCB layers it requires that, during the PCB manufacturing process, each PCB panel can undergo the manufacturing process depicted in FIG. 5.

Figure 5:
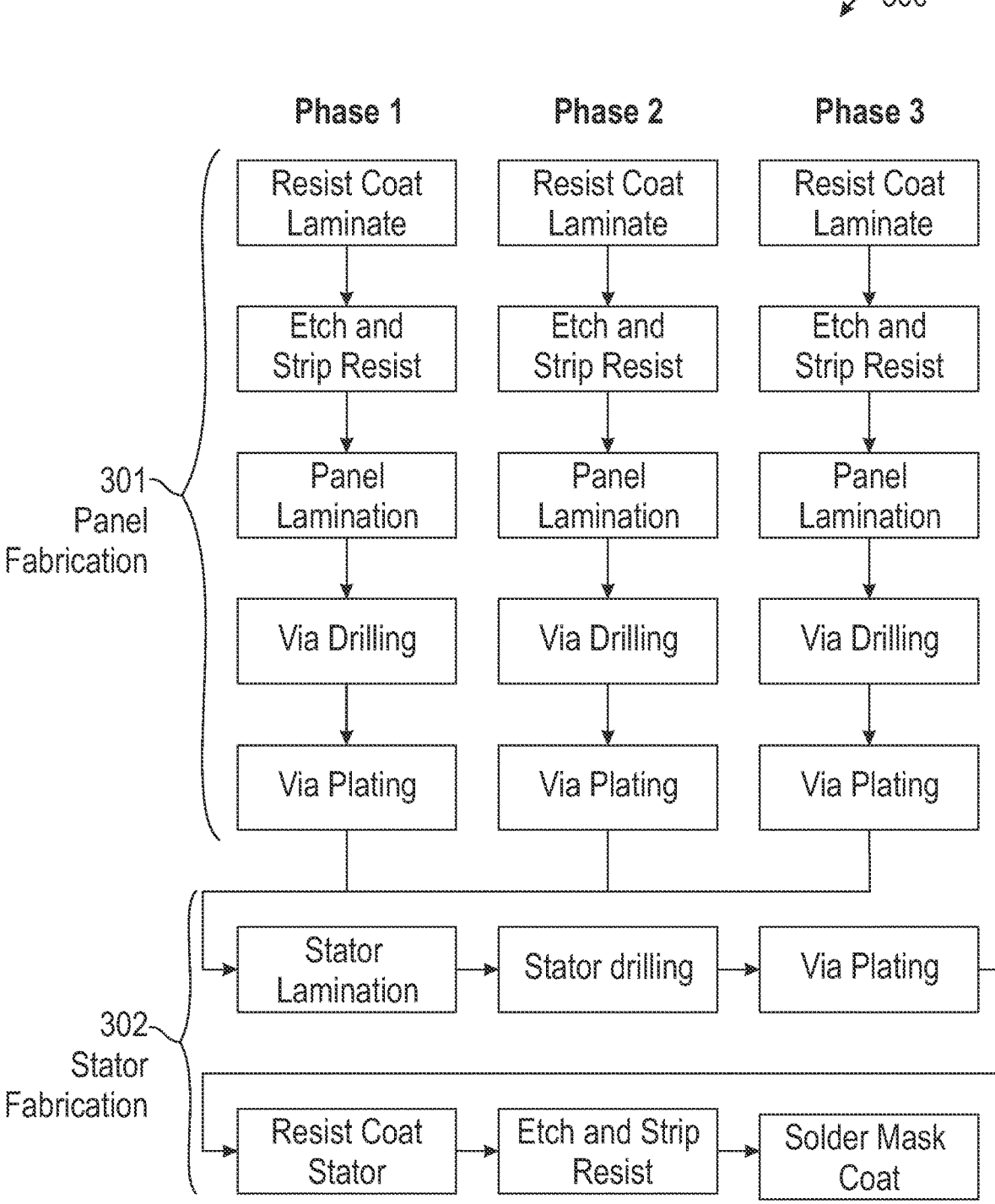
FIG. 5 is a process flow chart for manufacturing an embodiment of a PCB stator.

FIG. 5 shows a flow diagram of an embodiment of a manufacturing process 300 for a PCB stator were vias could intersect traces as depicted in the example in FIGS. 4A and 4B. In the process shown in FIG. 5, each PCB panel can undergo the process 301 that can include application of a photoresist, etching, resist stripping, panel lamination, via drilling and via plating. The process can be repeated for each phase of the PCB panel. After that, the phases panels of the PCB stators can undergo process 302, where they are laminated together to form the complete PCB stator. Subsequently, they can be drilled, plated, coated with resist, etched, stripped of remaining resist and coated with a solder mask, for example. Although FIG. 5 describes a process for a stator with three PCB panels with one panel per electrical phase, it should be understood that other PCB stators can have 2, 4, 5, 6 or more PCB panels with one panel per phase, so the process 301 can match the number of panels and/or phases.

In the example depicted in FIGS. 4A and 4B, the reason that the vias 230.1, 230.2, 230.3 can intersect the other coil traces is because the number of coil turns is not a multiple of the number of phases. The example in FIGS. 4A and 4B has coils with 5 turns which is not a multiple of 3, which is the number of phases.

Figure 6A:
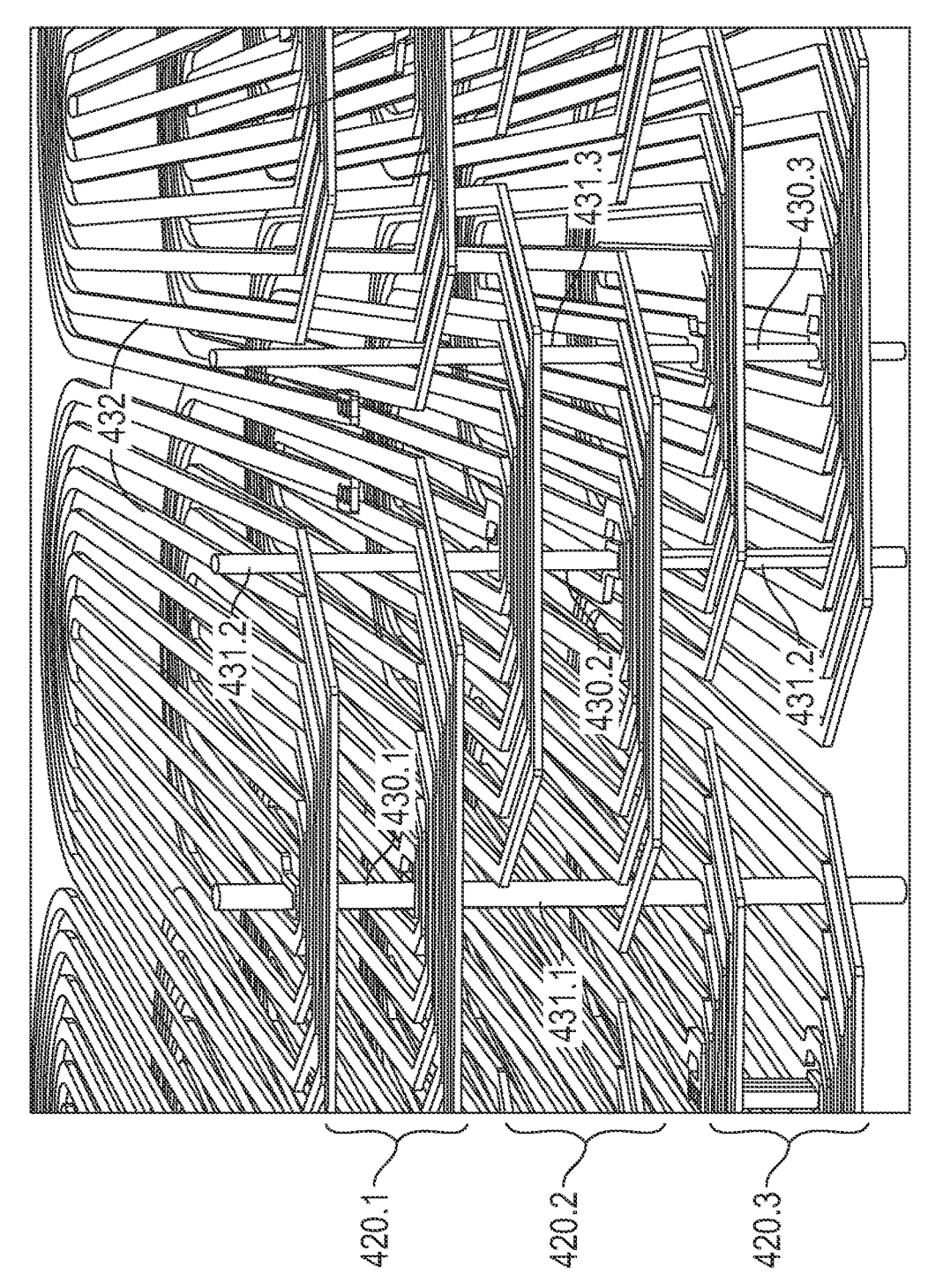
FIG. 6A is an exploded, isometric view of a portion of an embodiment of a PCB stator where the dielectric layers are not shown and the via length is increased for ease of understanding.
Figure 6B:
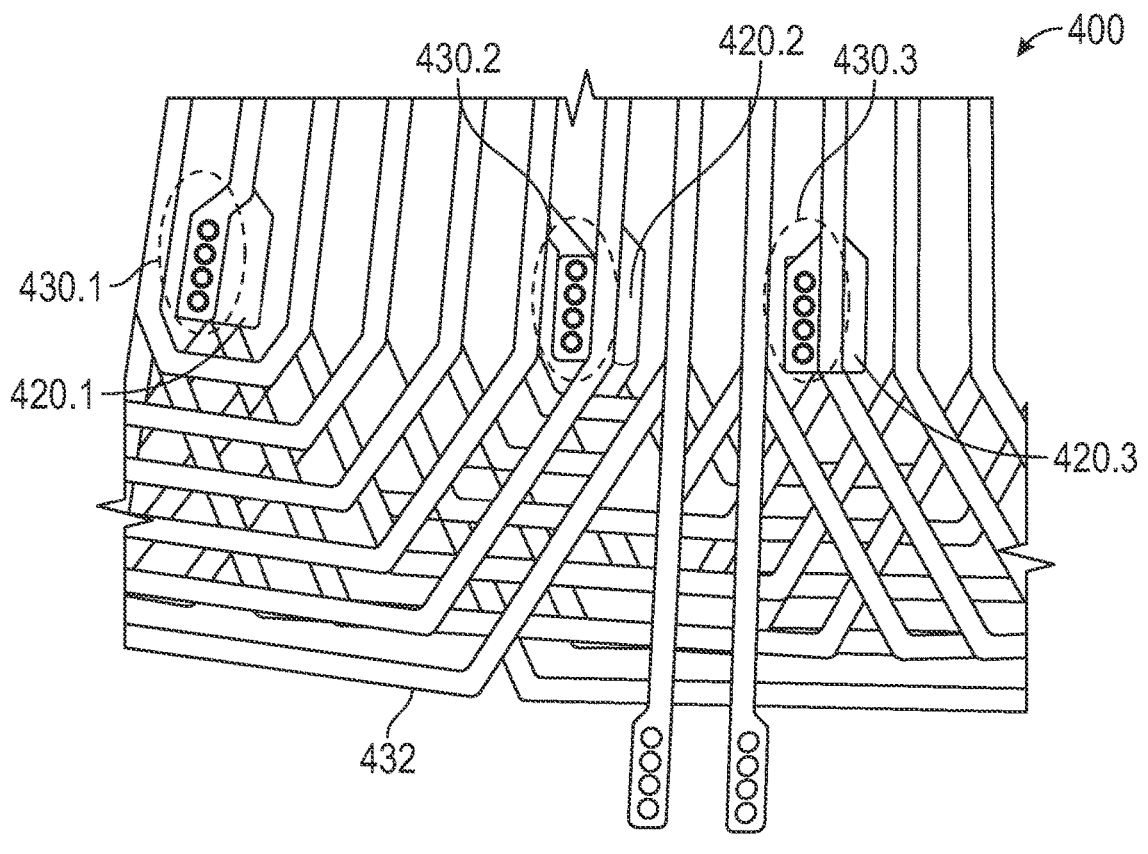
FIG. 6B is a top view of a portion of the stator of FIG. 6A.

In contrast, FIGS. 6A and 6B show an example of a 3-phase PCB stator 400 that have coils with 6 turns, which is multiple of 3, which is the number of phases in PCB stator 400. In FIGS. 6A and 6B, the dielectric material is not shown and the length of the vias are increased for easier visualization. In this example, the 3-phase PCB stator 400 has 2 layers per phase. Each pair of layers can form a PCB panel that comprises a plurality of coil subassemblies 420.1, 420.2 and 420.3, respectively, and each PCB panel can be assigned to one electrical phase. Each coil subassembly can comprise a set of plated vias 430.1, 430.2 and 430.3, respectively, that connects the coils in each coil subassembly 420.1, 420.2, 420.3 to form a continuous path. Similarly to the example shown in FIGS. 4A and 4B, the PCB stator panels in FIGS. 6A and 6B are rotatably shifted relative to each other by 120 electrical degrees, which is 360 electrical degrees divided by the number of phases. It should be noted that although each phase in PCB stator 400 has one pair of layers, other PCB stators can have 2, 3, 4 or more pairs of layers per phase.

In the example shown in FIGS. 6A and 6B, it can be seen that via 430.1 in coil subassembly 420.1 can be extended along the line 431.1, which is substantially co-linear with via 430.1, without intersecting any traces 432 in any other layers. Similarly, via 430.2 in coil subassembly 420.2 can be extended along the line 431.2, which is substantially co-linear with via 430.2, without intersecting any traces 432 in any other layers. Finally, via 430.3 in coil subassembly 420.3 can be extended along the line 431.3, which is substantially co-linear with via 430.3 without intersecting any traces 432 in any other layers.

FIG. 6B shows a top view of PCB stator 400 where the vias 430.1, 430.2 and 430.3 are indicated. It can be seen that the vias 430.1, 430.2, 430.3 do not intersect any traces 432 other than the traces in the layers that form the coils they are coupled to. In this embodiment where the number of turns of the coils is a multiple of the number of electrical phases, a via and its extension will intersect traces only in coils that belong to layers associated to that one phase. Said via and its extension will not intersect traces in coils that belong to layers associated with the other phases.

Figure 7:
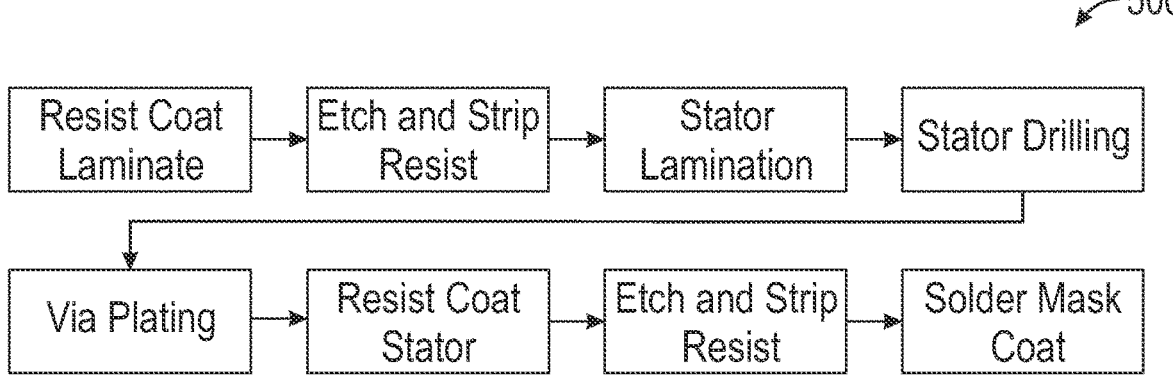
FIG. 7 is a process flow chart for manufacturing an embodiment of a PCB stator.

The via arrangement depicted in FIGS. 6A and 6B allows for a PCB manufacturing process 500 depicted in FIG. 7, which has fewer steps than the manufacturing process 300 depicted in FIG. 5. This is because all PCB stator layers can be laminated, via drilled and plated in one single step, which is faster and more economical than the manufacturing process 300 depicted in FIG. 5.

Due to requirements of axial field electric machine applications such as power, current and voltage, the PCB stator can have coils connected in series, parallel, or a combination of both. In some embodiments, each coil of the PCB stator can have two or more parallel traces. Thus, the current flowing through the coils of the PCB stator can be split among parallel traces. In those cases where parallel traces are employed, however, embodiments of the traces do not intersect each other along the coils, because that would create paths for eddy current circulation, which would create eddy current losses and degrade machine efficiency.

Figure 8A:
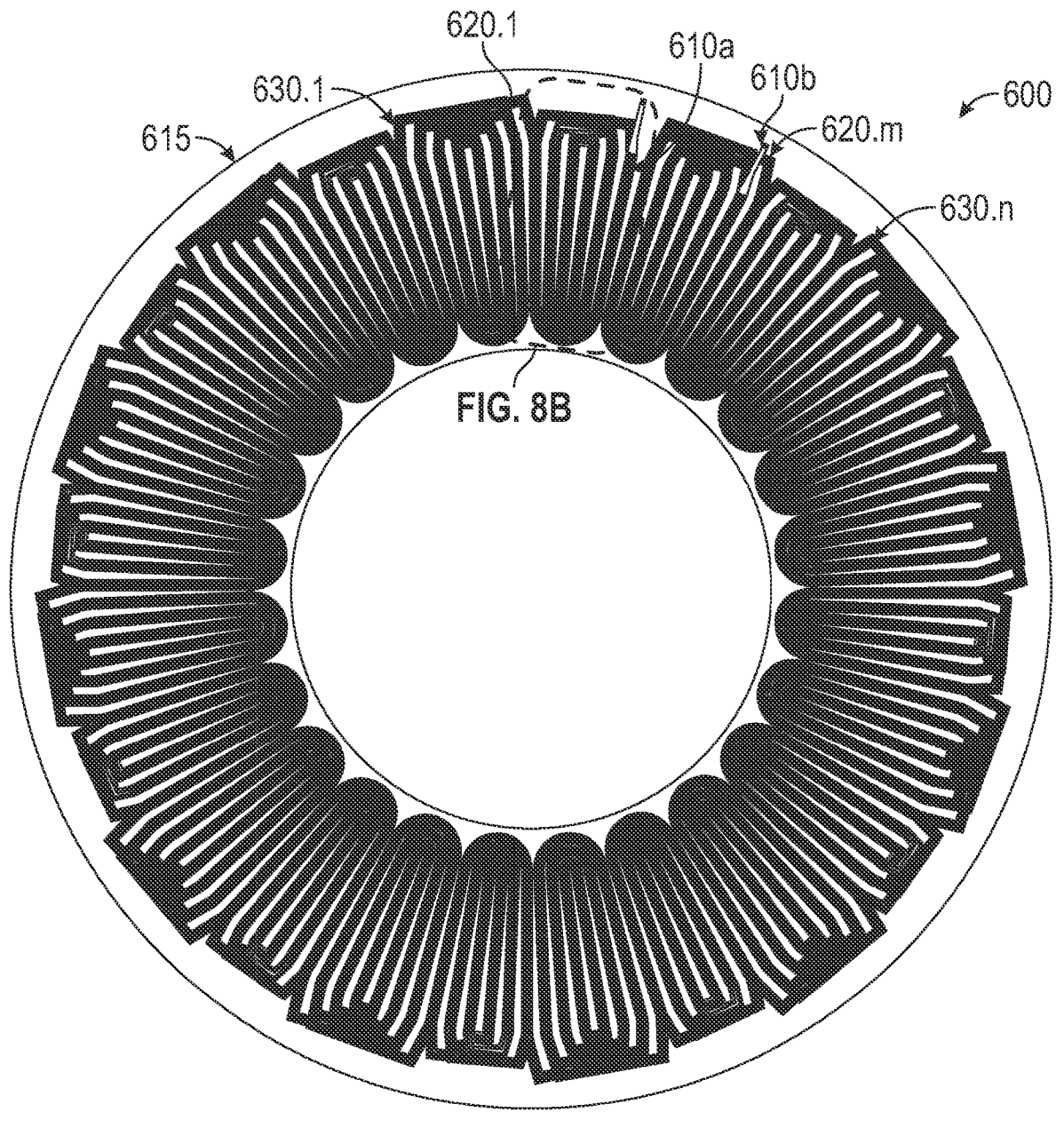
FIG. 8A is a front view of an embodiment of a PCB stator where coils have parallel traces.

FIG. 8A shows an example of a PCB stator 600 with parallel traces that can include a plurality of coils 610, 620.1 through 620.*m*, and coils 630.1 through 630.*n*. The coils may be etched, for example, in the copper foil of a laminated structure of the PCB. These copper coils can be supported by a dielectric structure 615 formed from, for example, epoxy-glass laminate, polyimide-glass laminate, or PTFE-ceramic laminate. The coils 610, 620.1 through 620.*m*, and 630.1 through 630.*n* can include multiple turns depending on the design of the PCB stator. While FIG. 8A shows an example of a 24-pole stator, many other pole configurations are possible. The PCB stator example shown in FIG. 8A has three turns per coil, however, other PCB stators can have coils with other numbers of turns.

Figure 8B:
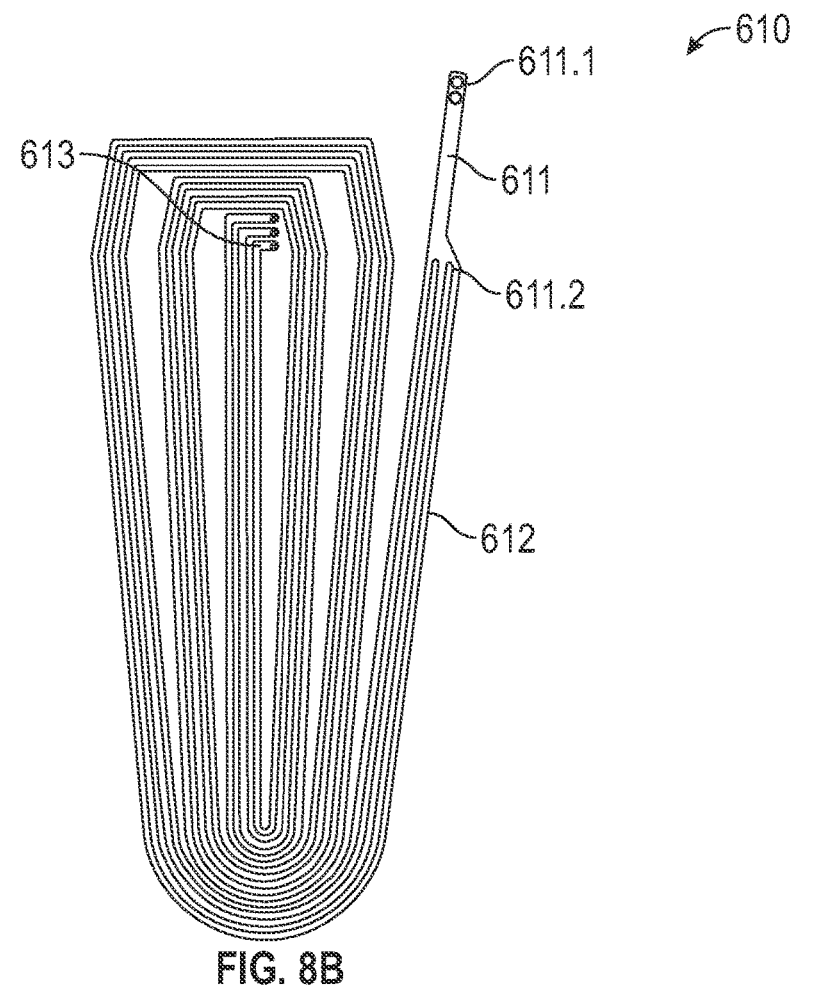
FIG. 8B is an enlarged front view of an embodiment of a coil in the PCB stator of FIG. 8A.

FIG. 8B shows an embodiment of an individual coil 610 which can have a terminal 611 that can be connected to an external voltage source, such as a VFD, at a first end 611.1.

At a second end 611.2, the terminal 611 can be split into multiple parallel traces 612 that form the coil 610. Although FIG. 8B shows the coil 610 with three parallel traces 612, other embodiments can have coils with two, four, five or more parallel traces, or just one single trace. Each trace 612 in coil 610 (which, in FIG. 8A, is the coil 610*a*, on the left) terminates in a respective terminal 613 (FIG. 8B). The terminals 613 are not connected to each other in any of the coils 610*a*, 620.1 through 620.*m*, or 630.1 to 630.*n*, until they circumscribe (in a counter-clockwise direction, in FIG. 8A) the entire PCB stator 600. The only point where the traces 612 reconnect is the second end 611.2 of terminal 611 of the second coil 610*b* (on the right side of FIG. 8A). Thus, the current from the external source can enter at coil 610*a* (via terminal 611), split into traces 612 and then exit at the terminal 611 of coil 610*b*.

Figure 8C:
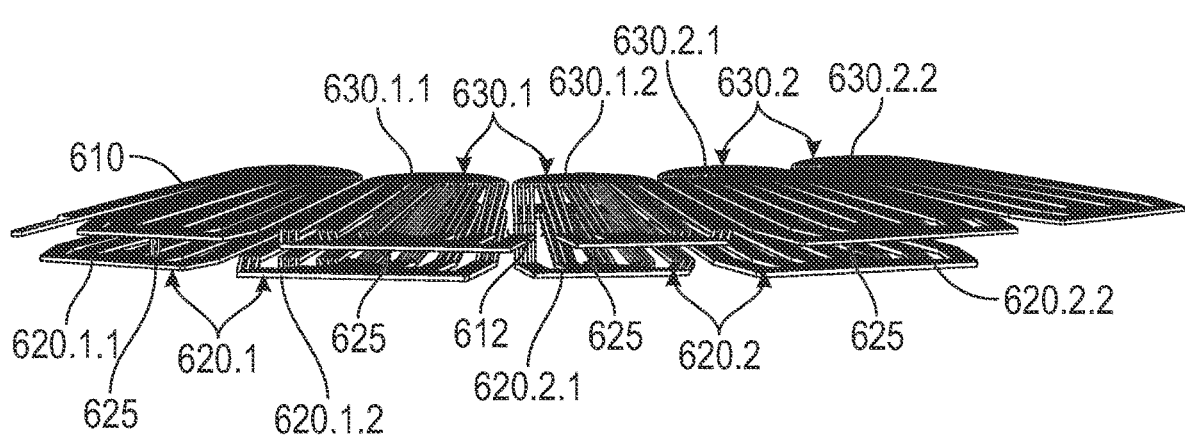
FIG. 8C is an exploded, isometric view of an embodiment of a set of coils in the PCB stator of FIG. 8A.

FIG. 8C shows a detailed view of an embodiment of a PCB stator where the dielectric structure is not shown for ease of understanding. In some versions, the coil 610 can be in one layer and connected to a coil 620.1 in another layer with vias 625. Coil 620.1 can have a first part 620.1.1 that can be circumferentially aligned with coil 610. A second part 620.1.2 can be in the same layer and adjacent to the first part 620.1.1 to form a continuous path of three non-intersecting traces. The second part 620.1.2 can be connected (with vias 625) to a first part 630.1.1 of a coil 630.1 that is in the same layer as coil 610. Second part 620.1.2 and first part 630.1.1 can be circumferentially aligned.

The second part 630.1.2 of coil 630.1 can be connected with vias 625 to a first part 620.2.1 of a coil 620.2 that is located in the same layer as the coil 620.1. Coils 620.1 and 620.2 can be identical to each other. Second part 630.1.2 and 620.2.1 can be circumferentially aligned. The second part 620.2.2 of the coil 620.2 can be connected to the first part 630.2.1 of a coil 630.2 that is located in the same layer as the coil 630.1 and coil 610. Coils 6301. And 630.2 can be identical to each other. Coils 620.2.2 and 630.2.1 can be circumferentially aligned. This pattern can repeat for the entire circumference of the PCB stator for up to coils 620.*m* and 630.*n*. In an example, the second part 620.*m*.2 of the last coil 620.*m* can connect to another coil 610 (which can be identical to the original coil 610), as shown in FIG. 8A.

In these embodiments, the traces 612 (FIGS. 8B and 8C) only intersect each other at the terminals 611 at both ends of the PCB stator panel winding. A continuous serial path is formed through the vias connections that each trace in each coil forms with corresponding traces in other coils.

Figure 9A:
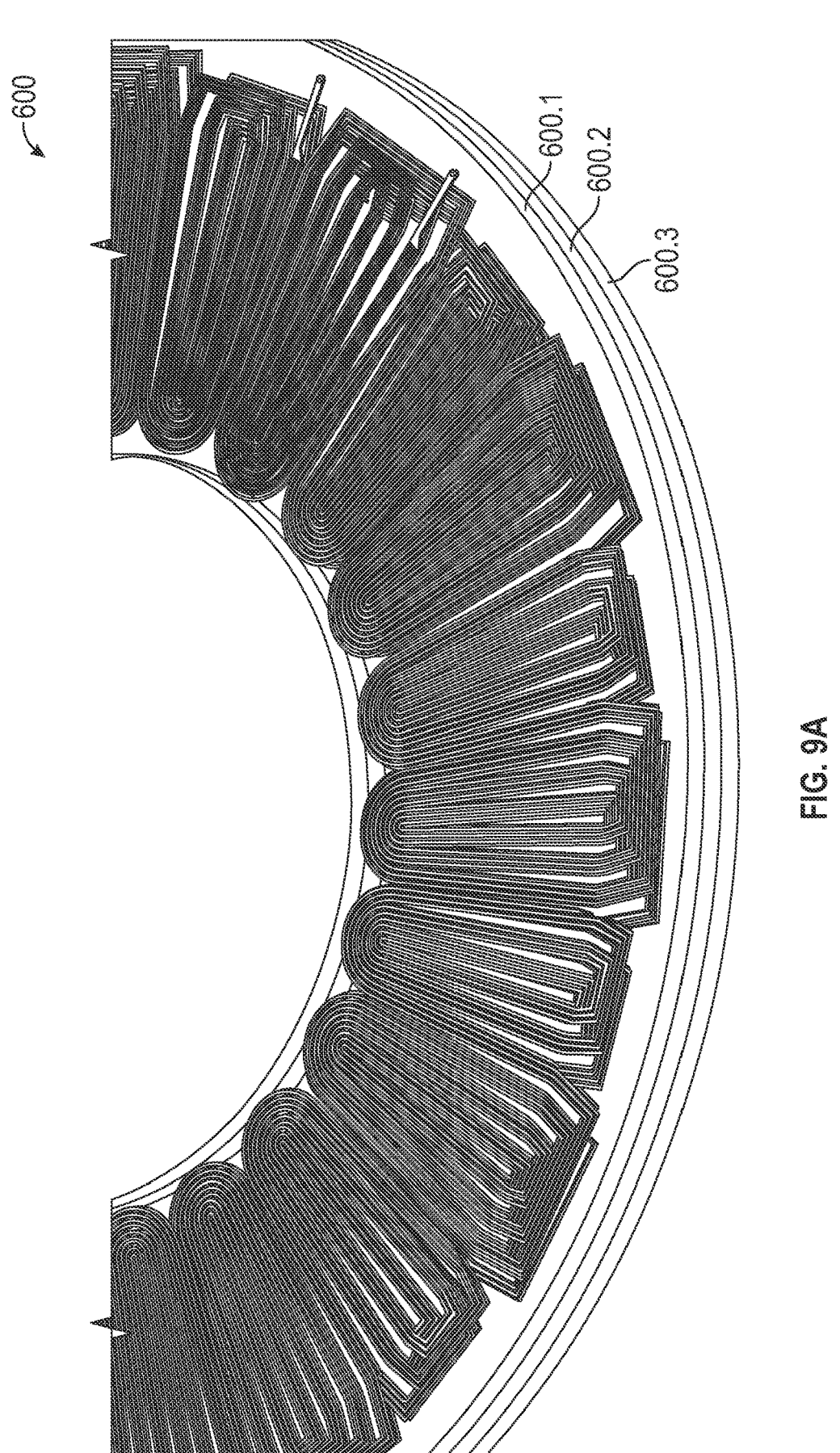
FIG. 9A is a partial, front, isometric view of an embodiment of the PCB stator of FIG. 8A.

Embodiments of the PCB stator 600 can have coils where the number of turns is a multiple of the number of phases. FIG. 9A depicts a partial view of the PCB stator 600 having three panels 600.1, 600.2 and 600.3, and each panel is assigned to one phase. In this embodiment, panels 600.1, 600.2 and 600.3 have one pair of layers each, however other embodiments can have more than one pair of layers.

Figure 9B:
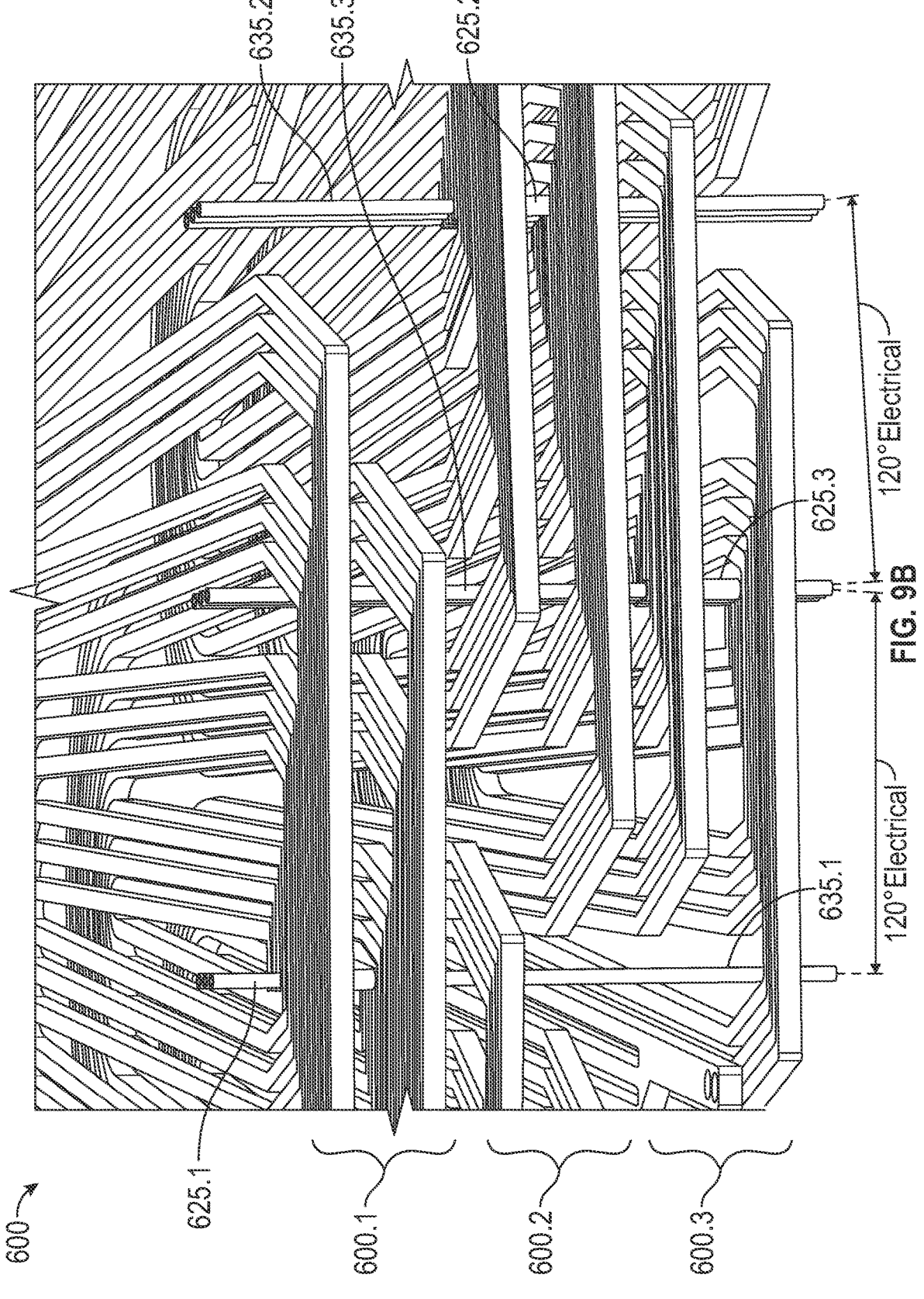
FIG. 9B is an enlarged, exploded, isometric view of a portion of the PCB stator of FIG. 9A.

FIG. 9B shows a detailed view of a portion of the PCB stator 600 where the dielectric structure is not shown for ease of understanding. PCB Stator 600 is 3-phase stator and has coils with 3 turns. There is a 120 electrical degree phase shift between the vias 625.1, 625.2 and 625.3, which can represent the phase shift between panels 600.1, 600.2 and 600.3, respectively. The via extensions 635.1, 635.2 and 635.3 can extend from the vias 625.1, 625.2 and 625.3, respectively, and intersect only the traces associated with the respective phases.

Figures 10, 11:
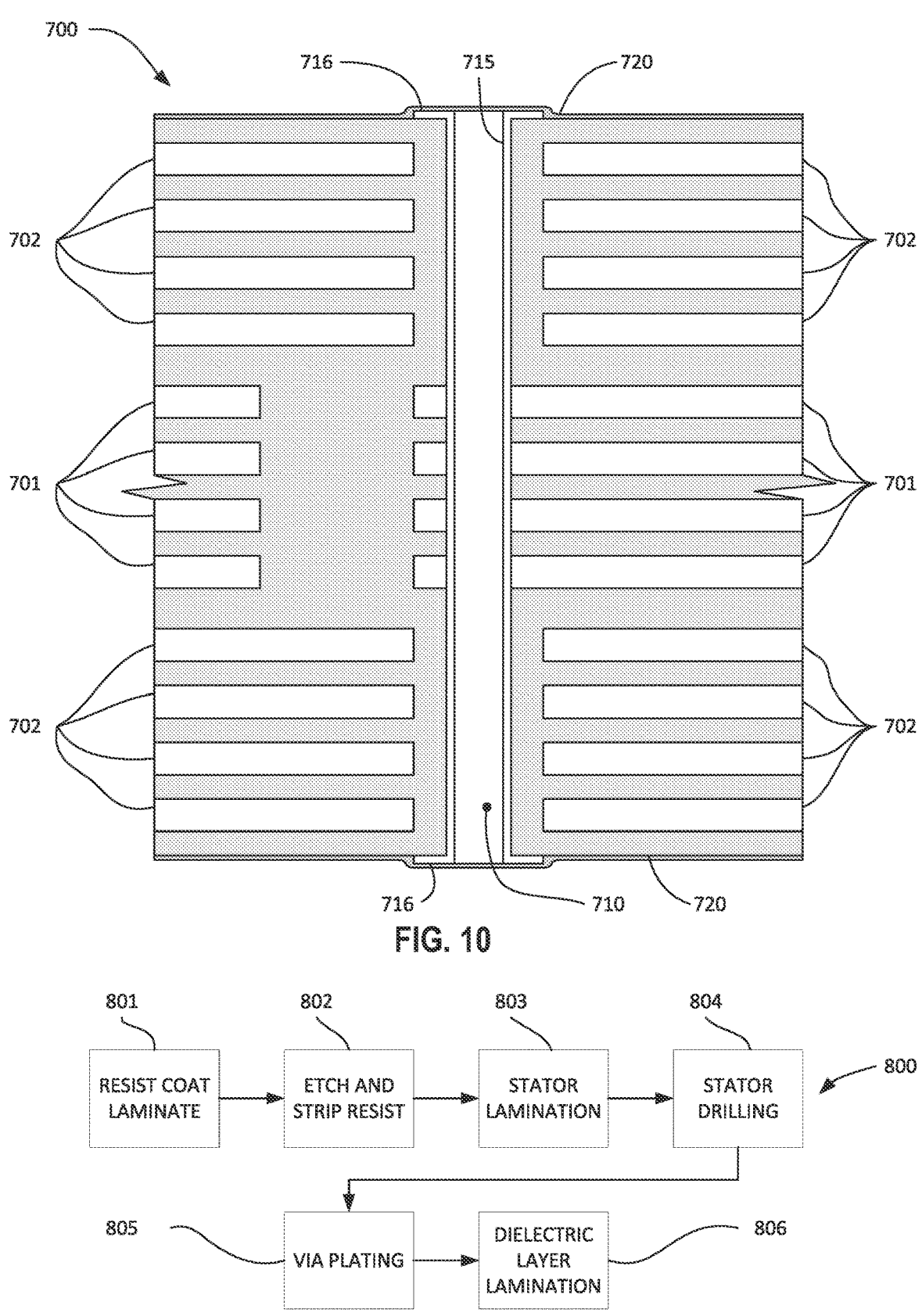
FIG. 10 is an enlarged cross-sectional view of a portion of a PCB stator showing a via and PCB layer details.
FIG. 11 is a process flow chart for manufacturing an embodiment of a PCB stator.

FIG. 10 shows a partial cross section of a PCB stator 700. PCB stator 700 includes a via 710 that can extend from one major surface (e.g., flat surface, in some examples) of the PCB stator 700 to another major surface thereof. The via 710 can be plated (see, e.g., step 805 in the manufacturing process 800 shown in FIG. 11) with a material having high thermal conductivity, such as copper, for example. The vias 710 can include one or more substantially cylindrical, electrically conductive tubes 715 that extend from one major surface of the PCB stator to the opposing major surface. The conductive tubes 715 are alternatively depicted as vias 625.2 and 635.2 in FIG. 9B, for example. As shown in FIG. 10, the tube 715 can be electrically connected to selected ones of the traces 701 while selectively not intersecting other traces 702 in the PCB stator 700.

During the plating process 805 (FIG. 11), and in addition to the conductive tube 715, a conductive pad 716 can be formed on the outer surface of the PCB stator 700. In normal operation of the axial field rotary energy device, a voltage of hundreds of volts can be applied to the pad 716, in some examples. In order to prevent an electrical hazard, such as an electric discharge between a pad 716 and the surface of a rotor 110 of the axial field rotary energy device 100 shown in FIG. 2, layers of B-stage glass-epoxy laminate, for example, can be laminated onto the external major surfaces of the PCB stator 700. The laminate can form a dielectric layer 720 that can completely cover and isolate the pad 716 electrically from surrounding components, such as rotor 110.

The lamination of the dielectric layer 720 is represented by step 806 (FIG. 11) in the PCB stator manufacturing process 800. This process can be simpler and more economical than the manufacturing processes 300 and 500 (FIGS. 5 and 7, respectively) where a solder mask coat is applied to the surfaces of the PCB stator. The dielectric layer 720 can have a high dielectric strength, such as 40 kV/mm, for example, and can enable the PCB stator 700 to withstand up to 3,000 Vdc or more during high voltage testing in some embodiments. This represents a substantial improvement over a typical solder mask coat which is not intended to provide dielectric protection and cannot withstand more than 1,000 Vdc in a high voltage test, for example. Embodiments of the PCB stator manufacturing process 800 can include other steps such as a resist coat lamination 801, an etch and strip resist 802, stator lamination 803 and stator drilling 804.

Some embodiments can have a laminated dielectric layer 720 made of a B-stage glass epoxy laminate, with typical off-plane (i.e.: normal to the plane of the glass epoxy laminate) thermal conductivity of 0.2 to 0.3 W/m·K. Other embodiments can employ a B-stage glass epoxy laminate with high off-plane thermal conductivity in the 2 to 3 W/m·K range. Furthermore, some embodiments can employ glass reinforced laminates with other resins, such as polyimide or polytetrafluorethylene based resins or others.

Figure 12A:
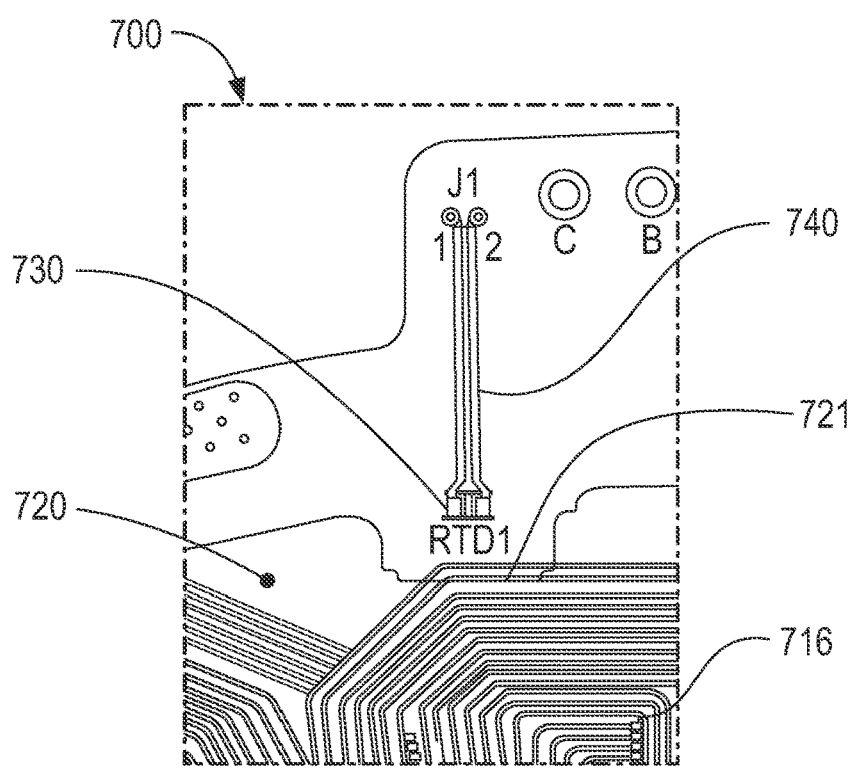
FIG. 12A is an enlarged view of a surface detail of a PCB stator.

The dielectric layer 720 can be configured to conform to features on the surface of the PCB stator 700. FIG. 12A shows an example of an embodiment of the dielectric layer 720 with a cutout 721 forming a recess providing clearance around conductive pads 730. The conductive pads 730 can receive, by means of soldering, a resistance temperature detector (RTD), for example, to sense the temperature of the PCB stator 700 during operation. The conductive pads 730 can be configured to receive other sensors 733 (shown schematically in FIG. 12B) such as thermistors, accelerometers, or other sensing devices. The conductive pads 730 can be connected to terminals 731 (FIG. 12B) by means of conductive traces 732. The conductive pads 730, terminals 731 and conductive traces 732 can be made from copper or other metal or alloy with good electrical conductivity and can be formed by etching.

Figure 12B:
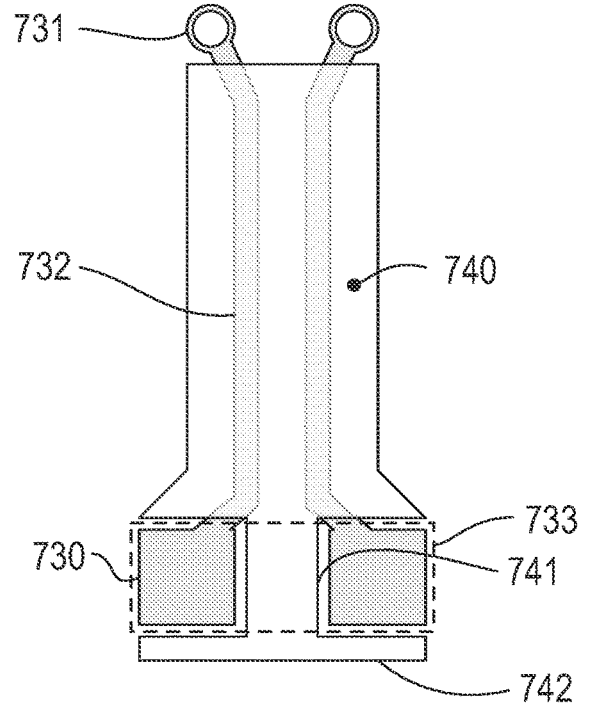
FIG. 12B is a further enlarged view of the detail shown in FIG. 12A.

In order to contain the solder alloy and prevent it from causing an electrical short circuit or a runoff on the surface of the PCB stator 700 while soldering a device to pads 730, a masking pattern 740 can be applied to the surface of the PCB stator 700. The masking pattern 740 can be applied with a silk-screen printing or ink jet printing, for example. Such processing can eliminate the need to apply a solder mask, which is a more complicated and expensive process. As shown in FIG. 12B, the masking pattern 740 can be configured to cover the conductive traces 732 that connect the conductive pads 730 to terminals 731 to protect conductive traces 732 from oxidation. The masking pattern 740 can comprise a barrier 741 to prevent molten solder from bridging the gap between the adjacent conductive pads 730 during the soldering operation. The masking pattern 740 can further comprise a contour 742 for preventing molten solder from running off over the surface of the PCB stator 700 (FIG. 12A). The masking pattern 740 can be 25 μm thick, for example, however other thicknesses also can be employed.

Figures 12C, 12D:
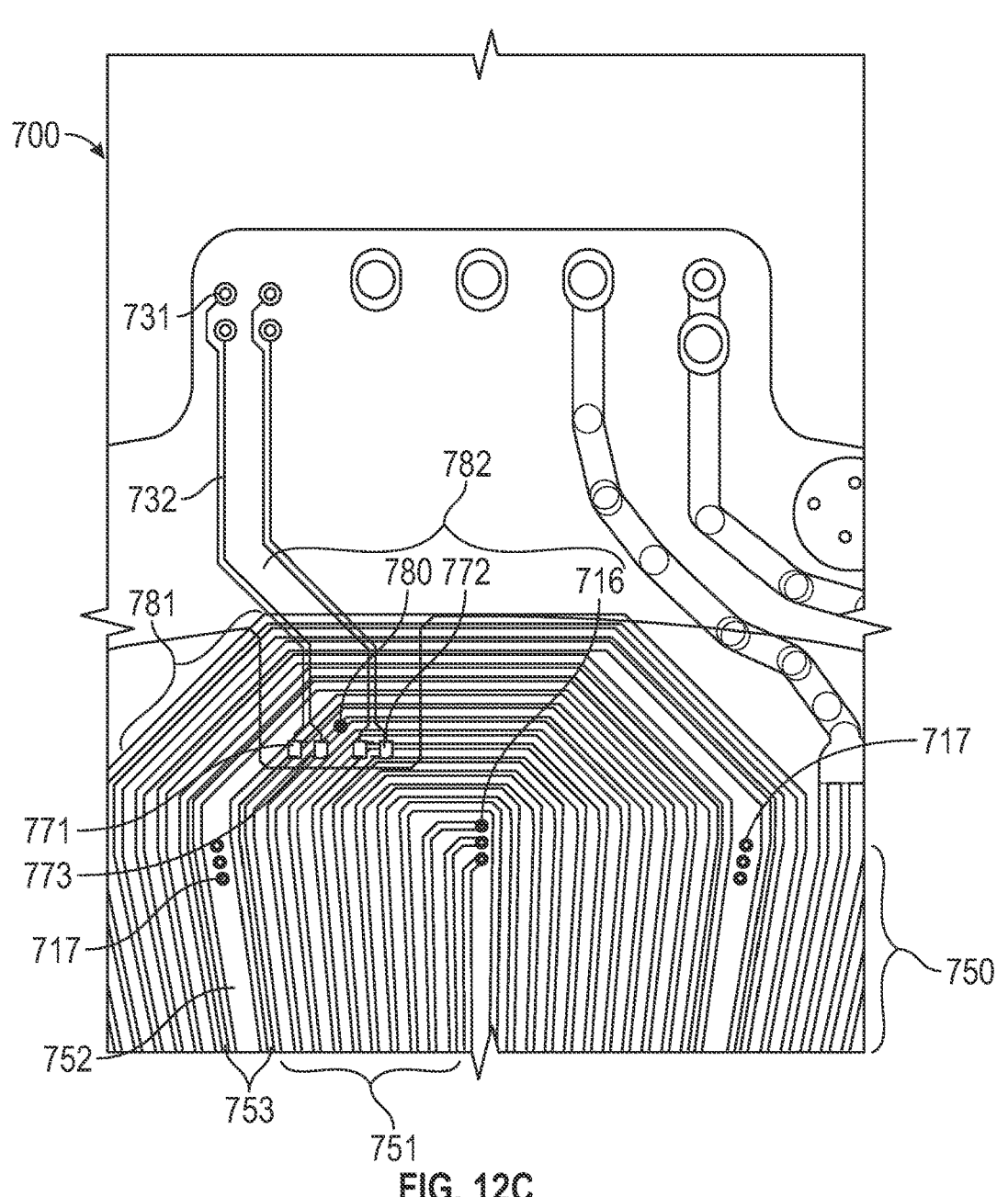
FIG. 12C is an enlarged view of another embodiment of a surface detail of a PCB stator.
FIG. 12D is a sectional view of the embodiment of the PCB stator shown in FIG. 12C.

FIG. 12C shows an embodiment of a PCB stator 700 where sets of conductive pads 771 and 772 for temperature sensors 773 (represented by dashed lines) can be located on the surface of the PCB stator 700, axially aligned with (i.e., parallel to the axis of rotation 120 in FIG. 2), or positioned adjacent to or substantially on top of the coil end turns 780 of the PCB stator 700 (end turns 780 are indicated by the black dot in FIG. 12C, and include all traces in regions 781 and 782). As shown in FIG. 12C, the end-turn traces in regions 781 and 782 have substantially the same width as the radial traces 750. The temperature sensors 773 can be RTDs, thermistors or thermocouples, for example. As shown in FIG. 12D the sets of conductive pads 771 and 772 and the coil end turns 780 are located in different conductive layers separated by an insulation layer 785 of a dielectric material, such as FR4 glass-epoxy laminate, for example. The insulation layer 785 can have an axial thickness in a range from about 50 μm to about 100 μm, and a dielectric strength of about 40 kV/mm or more, for example. This embodiment can enable a more accurate temperature measurement of the PCB stator 700 during operation. The temperature sensors 773 are closer to the coil end turns 780 than those in the embodiment shown in FIG. 12A, for example, where the pads 730 are spaced apart from and do not axially overlap the coil end turns 780. Some embodiments of the PCB stator 700 can have the insulation layer 785 comprise a glass epoxy laminate with high, off-plane thermal conductivity in the range of about 1 W/m·K to about 3 W/m·K, which can further enhance the accuracy of the temperature measurement provided by the sensors 773.

Figures 12E, 13:
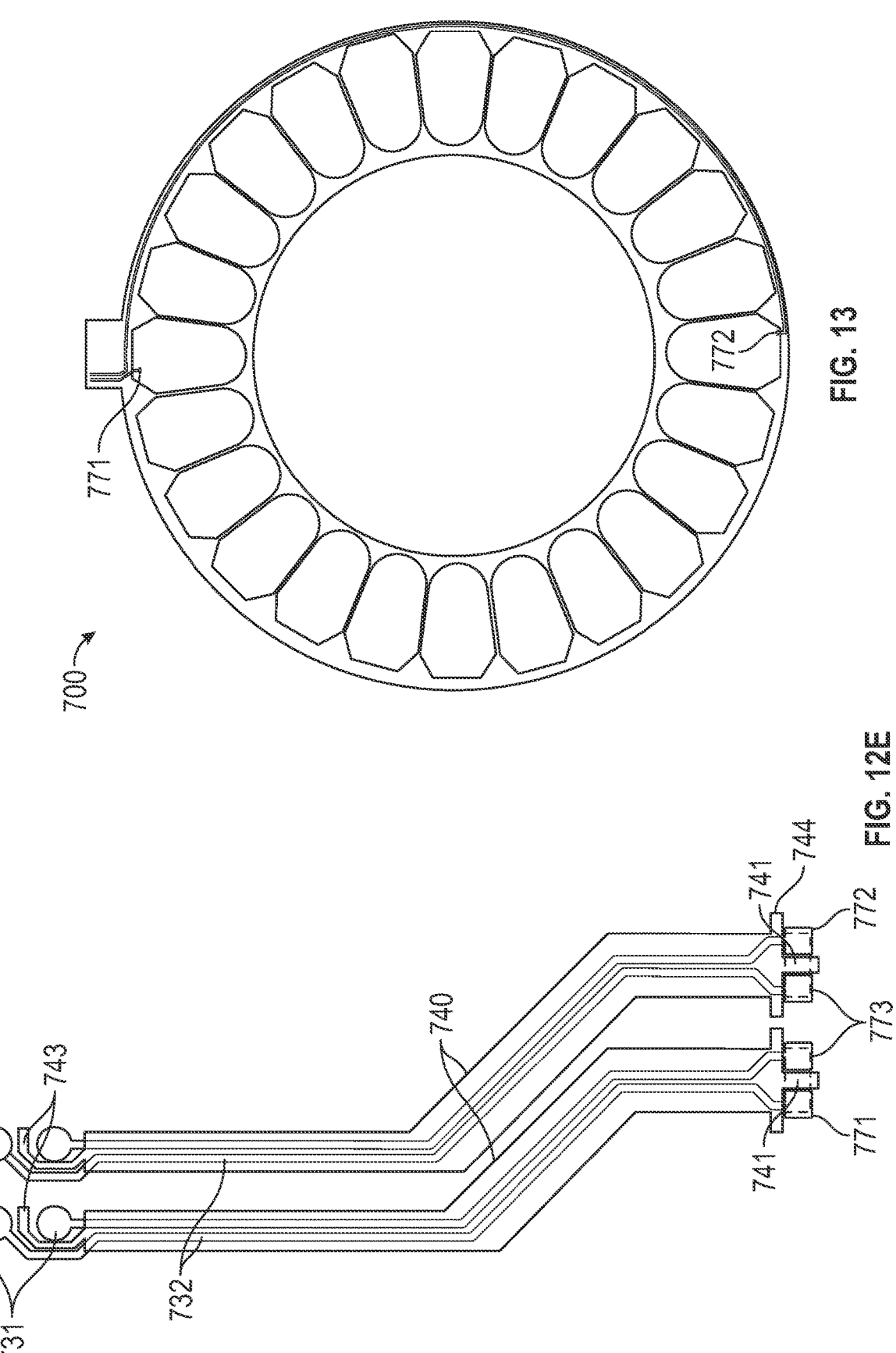
FIG. 12E is a further enlarged view of an embodiment of the surface detail shown in FIG. 12C.
FIG. 13 is a view of a PCB stator with conductive pads diametrically spaced.

In the embodiment of the PCB stator 700 shown in FIG. 12C, the set of conductive pads 771 is axially aligned with or located adjacent to a region 781 of the coil end turns 780 where the coil conductors are at a sloped orientation relative to the coil radial conductors 750. The set of conductive pads 772 is axially aligned with or located adjacent to another region 782 of the coil end turns 780 where the coil conductors are oriented in a substantially circumferential direction relative to the coil radial conductors 750. In some embodiments, both sets of conductive pads 771 and 772 are axially aligned with or located adjacent to region 781 of the end turns 780. Other embodiments can have both sets of conductive pads 771 and 772 axially aligned with or located adjacent to the other region 782 of the end turns 780. Some embodiments of the PCB stator 700 can have only one set of the conductive pads 771 or 772, or more than two sets of the conductive pads 771 and 772. Furthermore, some embodiments of the PCB stator 700 can have a first set of conductive pads 771 axially aligned with or located adjacent to a first set of coil end turns and a second conductive pad 772 axially aligned with or located adjacent to a second set of coil end turns as shown in FIG. 13.

The PCB stator 700 shown in FIG. 12C can have coils with a number of turns that is a multiple of the total number of electrical phases of the PCB stator 700 (e.g., 3-turn coils in a 3-phase PCB stator, for example). This can be similar to the embodiments shown in FIGS. 9B and 10 that have vias 710 extending from one major surface of the PCB stator 700 to another major surface thereof. The vias 710 can intersect traces in PCB layers assigned to one electrical phase, but not intersect traces in layers assigned to the other electrical phases. This arrangement, as previously explained, can facilitate the manufacturing process depicted in FIG. 7, where all PCB stator layers can be laminated, via drilled and plated in one single step, which can be faster and more economical than the manufacturing process 300 depicted in FIG. 5.

In FIG. 12C, the conductive pads 716 and respective vias are coupled to coils of the PCB stator 700 associated with one electrical phase of the PCB stator 700. The conductive pads 717 and respective vias are coupled to coils of another electrical phase of the PCB stator 700, which can be in another layer (which are not shown in FIG. 12C for clarity). Although the PCB stator 700 can be a 3-phase stator, other embodiments of the PCB stator can have less than 3 or more than 3 electrical phases.

In the embodiments of the PCB stator 700 shown in FIG. 12C, the spacing of the radial conductors 750 (see FIG. 12C) of the coils can be non-uniform. The non-uniformity can provide more clearance around the conductive pads 717. In the example shown in FIG. 12C, most conductors 751 can be uniformly spaced in a circumferential direction, relative to the axis. The conductors 753 near the conductive pads 717, however, can be bundled with closer spacing to form a wider gap 752 where the conductive pads 717 are located.

FIG. 12E depicts an enlarged view of an embodiment of the PCB stator 700 shown in FIG. 12C, showing the sets of conductive pads 771 and 772, and respective conductive traces 732 that connect the respective conductive pads to respective terminals 731. The sets of conductive pads 771 and 772, terminals 731 and conductive traces 732 can be made from copper or other metal or alloy with good electrical conductivity and can be formed by etching or plating.

In the example shown in FIG. 12E, barriers 741 can be formed between the pads of each set of conductive pads 771 and 772 to contain the solder alloy and prevent a solder bridge that can electrically short the pads while soldering the sensors 773 thereto. The barriers 741 can be part of a masking pattern 740 that can be applied to the surface of the PCB stator 700 to protect the conductive traces 732 from oxidation, for example. The masking pattern 740 can further comprise barriers 743 between respective terminals 731 to prevent the formation of solder bridges that can electrically short circuit the terminals 731 while soldering wires to them, for example. The masking pattern 740 and corresponding barriers 741 and 743 can be applied to the surface of PCB stator 700 by means of silk-screen printing or ink jet printing, for example. Such processing can eliminate the need to apply a solder mask, which is a more complex and expensive process. The masking pattern 740 can further comprise extensions 744 that can be substantially perpendicular to the barriers 741 and adjacent to the sets of conductive pads 771 and 772 to prevent molten solder from running off over the surface of the PCB stator 700. Although the embodiment shown in FIG. 12E has extensions 744 on the side of the masking pattern 740 near the point where the conductive traces 732 join the pads of the sets of conductive pads 771 and 772. Other embodiments can have extensions 742 near the edge of the conductive pads opposite to the side where the conductive traces 732 join the conductive pads (FIG. 12B). The masking pattern 740 can be 25 μm thick, for example, however other thicknesses can also be employed.

Other embodiments can include one or more of the following items.

1. An axial field rotary energy device, comprising:
   a rotor having an axis of rotation;
   a printed circuit board (PCB) stator comprising PCB panels, each PCB panel comprises conductive layers, each conductive layer comprises coils, and each coil has radial conductors and end turn conductors; and
   the PCB stator further comprises conductive pads coupled to a temperature sensor, each conductive pad is connected to a terminal through a respective conductive trace, the conductive pads are axially aligned or located directly adjacent to respective end turn conductors in a conductive layer that is separated from the end turn conductors by an insulation layer.

2. The axial field rotary energy device wherein the conductive pads comprise a first set of conductive pads that are located adjacent to a sloped portion of the end turn conductors relative to the radial conductors, and a second set of conductive pads that are located adjacent to a portion of the end turn conductors that are substantially circumferential relative to the radial conductors.

3. The axial field rotary energy device wherein all of the conductive pads are axially aligned or located directly adjacent respective portions of the end turn conductors that are substantially circumferential relative to the radial conductors.

4. The axial field rotary energy device wherein all of the conductive pads are axially aligned or located directly adjacent respective portions of the end turn conductors that are sloped relative to the radial conductors.

5. The axial field rotary energy device wherein a first set of conductive pads are located above a first set of coil end turns and a second set of conductive pads are located above a second set of coil end turns.

6. The axial field rotary energy device wherein the insulation layer between the conductive pads and the end turn conductors has a thickness in a range of about 50 μm to about 100 μm in an axial direction.

7. The axial field rotary energy device further comprising one or more of:
   the insulation layer has an off-plane thermal conductivity in a range of 1 W/mK to 3 W/mK; or
   the insulation layer has a dielectric strength of 40 kV/mm or more.

8. An axial field rotary energy device, comprising:
   a printed circuit board (PCB) stator comprising PCB panels, each PCB panel comprises conductive layers, and each conductive layer comprises:
   coils and each coil has radial conductors;
   first conductive pads coupled to the coils in a first layer of the conductive layers;
   second conductive pads that are not coupled to the coils in the first layer, and the second conductive pads are coupled to coils in a second layer;
   a first portion of the radial conductors in the first layer are equally spaced apart in a circumferential direction;

a second portion of the radial conductors that is adjacent to the second conductive pads have a closer spacing than the first portion of the radial conductors to provide clearance for the second conductive pads.

9. The axial field rotary energy device wherein the first conductive pads are connected to a first electrical phase, and the second conductive pads are connected to a second electric phase.

10. An axial field rotary energy device, comprising:
   a printed circuit board (PCB) stator comprising PCB panels, each PCB panel comprises conductive layers, each conductive layer comprises coils, and each coil has end turns; and the PCB stator further comprises: conductive pads coupled to temperature sensors, each conductive pad is connected to a terminal through conductive traces;
   a masking pattern covers the conductive traces and forms barriers to prevent molten solder from bridging across adjacent ones of the conductive pads, and from running off on major surfaces of the PCB stator, and to prevent molten solder from bridging across adjacent ones of the terminals and from running off on the major surfaces of the PCB stator.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

What is claimed is:

1. An axial field rotary energy device, comprising:
a rotor having an axis of rotation;
a printed circuit board (PCB) stator comprising PCB panels, each PCB panel comprises conductive layers, each conductive layer comprises coils, and each coil has radial conductors and end turn conductors, wherein the end turn conductors have a substantially same width as the radial conductors; and
the PCB stator further comprises conductive pads coupled to a temperature sensor, each conductive pad is connected to a terminal through a respective conductive trace, wherein the conductive pads are axially aligned or located directly adjacent to respective end turn conductors in a conductive layer that is separated from the end turn conductors by an insulation layer; and wherein the temperature sensor directly overlaps the end turn conductors.

2. The axial field rotary energy device of claim 1, wherein the conductive pads comprise a first set of conductive pads that are located adjacent to a sloped portion of the end turn conductors relative to the radial conductors, and a second set of conductive pads that are located adjacent to a portion of the end turn conductors that are substantially circumferential relative to the radial conductors.

3. The axial field rotary energy device of claim 2, wherein the insulation layer between the conductive pads and the end turn conductors has a thickness in a range of about 50 μm to about 100 μm in an axial direction.

4. The axial field rotary energy device of claim 3, further comprising one or more of:
the insulation layer has an off-plane thermal conductivity in a range of 1 W/mK to 3 W/mK; or
the insulation layer has a dielectric strength of 40 kV/mm or more.

5. The axial field rotary energy device of claim 1, wherein all of the conductive pads are axially aligned or located directly adjacent respective portions of the end turn conductors that are substantially circumferential relative to the radial conductors.

6. The axial field rotary energy device of claim 5, wherein the insulation layer between the conductive pads and the end turn conductors has a thickness in a range of about 50 μm to about 100 μm in an axial direction.

7. The axial field rotary energy device of claim 6, further comprising one or more of:
the insulation layer has an off-plane thermal conductivity in a range of 1 W/mK to 3 W/mK; or the insulation layer has a dielectric strength of 40 kV/mm or more.

8. The axial field rotary energy device of claim 1, wherein all of the conductive pads are axially aligned or located directly adjacent respective portions of the end turn conductors that are sloped relative to the radial conductors.

9. The axial field rotary energy device of claim 8, wherein the insulation layer between the conductive pads and the end turn conductors has a thickness in a range of about 50 μm to about 100 μm in an axial direction.

10. The axial field rotary energy device of claim 9, further comprising one or more of:
the insulation layer has an off-plane thermal conductivity in a range of 1 W/mK to 3 W/mK; or
the insulation layer has a dielectric strength of 40 kV/mm or more.

11. The axial field rotary energy device of claim 1, wherein a first set of conductive pads are located above a first set of coil end turns and a second set of conductive pads are located above a second set of coil end turns.

12. The axial field rotary energy device of claim 11, wherein the insulation layer between the conductive pads and the end turn conductors has a thickness in a range of about 50 μm to about 100 μm in an axial direction.

13. The axial field rotary energy device of claim 12, further comprising one or more of:
the insulation layer has an off-plane thermal conductivity in a range of 1 W/mK to 3 W/mK; or
the insulation layer has a dielectric strength of 40 kV/mm or more.

14. The axial field rotary energy device of claim 1, wherein the insulation layer between the conductive pads and the end turn conductors has a thickness in a range of about 50 μm to about 100 μm in an axial direction.

15. The axial field rotary energy device of claim 14, further comprising one or more of:
the insulation layer has an off-plane thermal conductivity in a range of 1 W/mK to 3 W/mK; or
the insulation layer has a dielectric strength of 40 kV/mm or more.

16. An axial field rotary energy device, comprising:
a printed circuit board (PCB) stator comprising PCB panels, each PCB panel comprises conductive layers, and each conductive layer comprises:
coils and each coil has radial conductors;
first conductive pads coupled to the coils in a first layer of the conductive layers;
second conductive pads that are not coupled to the coils in the first layer, and the second conductive pads are coupled to coils in a second layer;
a first portion of the radial conductors in the first layer are equally spaced apart in a circumferential direction; and
a second portion of the radial conductors that is adjacent to the second conductive pads have a closer spacing than the first portion of the radial conductors to provide clearance for the second conductive pads.

17. The axial field rotary energy device of claim 16, wherein the first conductive pads are connected to a first electrical phase, and the second conductive pads are connected to a second electrical phase.

18. An axial field rotary energy device, comprising:
a printed circuit board (PCB) stator comprising PCB panels, each PCB panel comprises conductive layers, each conductive layer comprises coils, and each coil has end turns wherein the PCB stator further comprises:

conductive pads coupled to temperature sensors, and
each conductive pad is connected to a terminal
through conductive traces; and
a masking pattern that covers the conductive traces and
forms barriers to prevent molten solder from bridging across adjacent ones of the conductive pads, and
from running off on major surfaces of the PCB stator,
and to prevent molten solder from bridging across
adjacent ones of the terminals and from running off
on the major surfaces of the PCB stator, wherein the
masking pattern is non-conductive that avoids a short
circuit of the terminal.

* * * * *